March 31, 1959 K. SCHLESINGER 2,880,363

COLOR TELEVISION RECEIVER

Filed Oct. 24, 1955 2 Sheets-Sheet 1

INVENTOR.
Kurt Schlesinger
BY Mueller & Aichele
Attys.

INVENTOR.
Kurt Schlesinger
BY
Mueller & Aichele
Attys.

United States Patent Office 2,880,363

Patented Mar. 31, 1959

2,880,363

COLOR TELEVISION RECEIVER

Kurt Schlesinger, La Grange, Ill., assignor to Motorola, Inc., Chicago, Ill., a corporation of Illinois Application October 24, 1955, Serial No. 542,184

12 Claims. (Cl. 315—13)

This invention relates to color television receivers and more particularly to systems for converging the electron beams of a tri-beam cathode ray tube in the various scanned positions thereof.

In one type of color television receiver, a tri-beam cathode ray tube is utilized wherein each beam is associated with a so-called primary color and the beams are converged in apertures of a shadow mask near the viewing screen which screen comprises phosphor dots to be individually impinged by the beams. The beams are modulated by components of a received television signal and the phosphor dots are arranged in triad groups to be impinged by the three beams and to form elements of a composite picture having the proper color determined by the separate energization of the phosphor dots in a triad. Scanning of the beams horizontally and vertically across the screen is effected by a sweep system including, in most cases, a magnetic deflection yoke for producing a scanning field controlled by the received signal. Each beam strikes only its intended phosphor dot as it is scanned since the apertures of the shadow mask are in general aligned with the approach path of the beam and its phosphor dots.

In a practical system of this type however, provision must be made for dynamic convergence, or control and modification of the approach path, of the beams as they converge in different apertures of the shadow mask. This is due to several causes, one of which is beam parallax or the fact that the beams are emitted from sources equally spaced about an axis of the tube so that they are off axis when arriving at the scanning field of the deflection yoke. This deflection field has considerable dimension in the direction of beam travel, that is along the axis of the tube, so that the beams experience dissimilar portions of the deflection field as they are bent or deflected thus producing nonuniformity in the deflection among the three beams. Furthermore, the beam sources are generally tilted somewhat toward the axis of the tube so as to provide substantial convergence at a given location of the shadow mask, for example, the center thereof, and this is responsible for progressive separation of the beam traces, or lack of convergence, with increased deflection of the beams.

Substantial correction of this misconvergence of the beams may be obtained through the use of a correcting field individually associated with each beam and adapted to the beam angle of entry into the deflection field according to the horizontal and vertical scanned positions thereof. It has been found that proper correcting fields for the beams may be produced by fields varying according to parabolic wave forms at the vertical and horizontal scanning frequencies. Such fields may be produced for example, by current of parabolic wave shape flowing in suitable convergence coils located adjacent the paths of the beams through the neck of the cathode ray tube.

My copending application Serial No. 379,998, filed

September 14, 1953, describes and claims a system wherein signals to produce dynamic convergence of the beams at the horizontal scanning frequency, normally 15.75 kc. in the present systems, may be produced by the use of resonant circuits energized by the horizontal sweep system of the receiver. A resonant circuit, may, of course, provide a cosine wave at the horizontal frequency which will approximate a signal of parabolic wave shape. However, such a cosine wave will differ somewhat from the desired parabolic shape and may be shown to be in error at some points of its wave form. The abovementioned patent application also describes and claims a system which incorporates with the cosine wave at horizontal frequency a wave form of the second harmonic of this cosine wave, that is, a cosine wave at a frequency of 31.5 kilocycles. Such a combination of fundamental and second harmonic wave forms may be shown mathematically to provide a much closer approximation to the desired parabolic wave form and one in which the departure from this desired forms is substantially reduced over the pure cosine wave form.

It is an object of this invention to provide a simplified and improved system to furnish a dynamic convergence signal closely approximating the desired parabolic wave shape for practical purposes.

Another object is to provide an improved dynamic convergence for a tri-beam cathode ray tube which produces a current wave form of essentially parabolic shape for use in magnetically converging the beams in the various scanned positions thereof.

Still another object of the invention is to provide a dynamic convergence system for a tri-beam cathode ray tube as used in a color television receiver which system is energized by the horizontal scanning system of the receiver and requires but a minimum of power therefrom.

A feature of the invention is the provision of a dynamic convergence system including a beam influencing inductor and associated reactance elements to provide resonance at the horizontal scanning frequency and the second harmonic thereof so that one of a plurality of electron beams may be converged by a field produced through current flow in the inductor which is of approximately parabolic wave shape.

A further feature of the invention is the provision of a dynamic convergence system including a convergence coil associated with each electron beam in a tri-beam cathode ray tube and associated inductance capacitance elements coupled through a source of signals at the horizontal scanning frequency and in which the inductance capacitance elements exhibit the necessary capacitative properties so that these elements and each associated coil form a biresonant circuit to develop current flow in the coil of a wave shape closely approximating that of a parabola.

Additional objects, features and the attending advantages thereof will be apparent upon consideration of the following description when taken in conjunction with the accompanying drawings in which.

Figures 1, 2, 3:
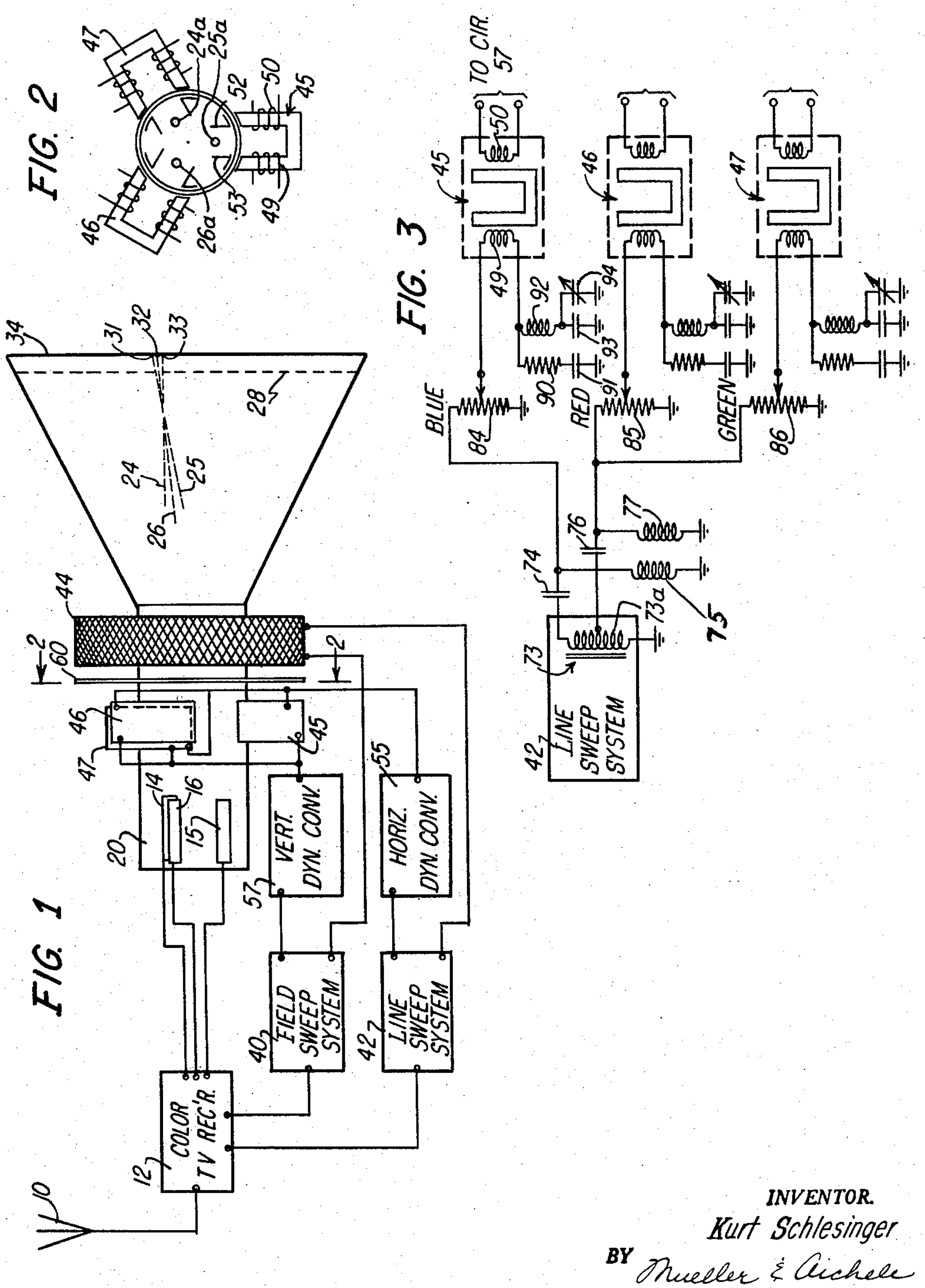
Fig. 1 is a block diagram representing a color television receiver.
Fig. 2 is a sectional view along the line 2—2 of Fig. 1.
Fig. 3 is a schematic circuit diagram of a portion of the receiver of Fig. 1.

This invention provides a system for converging the beams of a tri-beam cathode ray tube in the apertures of a shadow mask as the beams are scanned across the mask to pass through the apertures therein and impinge particular phosphor dots of a screen on the other side of the mask. In one form of the invention, for converging the beams at the horizontal scanning frequency, a winding on the horizontal output transformer in the receiver sweep system provides signals of the horizontal scanning frequency for energizing a convergence coil mounted adjacent each beam path through the tube neck as well as associated capacitor inductor elements coupled to each convergence coil. The capacitor inductor elements are arranged so as to form a high Q bi-resonant network in conjunction with the associated convergence coil so that current flow through each coil is comprised of a cosine wave at the horizontal scanning frequency and the second harmonic of this wave. The resulting current flow through the convergence coils then closely approximates the desired parabolic current which converges the beams in their different horizontally scanned positions. Suitable circuitry may also be provided for convergence in the various vertically scanned positions of the beams so that distorting effects caused by the deflection field as above mentioned are overcome and the beams are properly directed through the apertured shadow mask to strike their intended phosphor dots.

Considering now the invention in greater detail, reference will be made to Figs. 1 and 2. The antenna 10 is connected to the color television receiver 12 which demodulates a received signal and supplies signals to the electron guns 14, 15 and 16 in the cathode ray tube 20. As previously mentioned, each gun is associated with a primary color and produces an electron beam represented as beams 24, 25 and 26. Beams are converged in the apertures of the shadow mask 28 and then impinge phosphor dots 30, 31 and 32 comprising a triad group of the viewing screen 34.

Apertures of the shadow mask are arranged so that each beam in passing through a given aperture at a certain angle will impinge only phosphor dots which emit light of one primary color when energized. The triad group of phosphor dots then appears as an element of the display on screen 34 and assumes a color corresponding to the relative excitation of the phosphor dots as energized by the electron beams. The complete picture on the viewing screen 34 is of course comprised of all of the triad groups as energized by the beams scanned across the screen. The system in Figs. 1 and 2 has, of course, been shown out of proportion for the purposes of clarity.

In order to accomplish scanning of the beams, horizontally and vertically across the viewing screen 34, a vertical or field sweep system 40 is coupled to the receiver 12 and a horizontal or line sweep system 42 is also coupled to the receiver. The systems 40 and 42 utilize synchronizing components from the received signal and supply deflection signals to the deflection yoke 44 which is mounted on the neck of the cathode ray tube 20 in order to provide suitable scanning of the electron beams. As previously mentioned, the deflection field produced by the yoke 44 has a considerable dimension along the axis of the tube 20 and through which each beam must pass. Furthermore, it may be noted that the electron guns 14—16 are equally spaced about the axis of the tube so that as the beams from the guns are scanned across the screen 34 they will experience differing portions of the deflection field. In a practical construction of the tube 20, the electron guns 14—16, or beam sources, are tilted somewhat toward the tube axis (not shown in the drawing) and this further causes a difference in the treatment of the electron beams by the scanning field.

Accordingly, in order to effect convergence of the three beams, in the various scanned positions thereof, convergence coils 45, 46 and 47 are supported in equally spaced arrangement about the neck of the cathode ray tube 20 with each coil mounted adjacent the path of an electron beam as shown at paths 25*a*, 24*a* and 26*a* in Fig. 2. The convergence coil 45 consists of a U-shaped core 47 with a winding 49 on one leg thereof and a winding 50 on the other leg thereof. The ends of the U-shaped core 47 are in alignment with members 52, 53 on the interior of tube 20 and between which the beam emitted from gun 15 passes along path 25*a*. Suitable currents of parabolic wave form at the horizontal frequency are applied to winding 49 and current of similar wave form at the vertical frequency is applied to winding 50 in order to converge the beam emitted from gun 15 so that it passes through the various apertures of shadow mask 28 at the proper angle to impinge the phosphor dots associated with that beam as the beam is scanned across the screen.

Suitable signals for energizing windings 49 and 50 are developed respectively in the horizontal dynamic convergence circuit 55 and the vertical dynamic convergence circuit 57. Circuit 55 is coupled to, and energized by, the line sweep system 42 and convergence circuit 57 is energized by the field sweep system 40. Convergence coils 46 and 47 are respectively associated with the beams produced by electron guns 16 and 14 and are constructed and wired in a manner entirely similar to that of the convergence coil 45. As shown in Fig. 1 a suitable shield 60 may be provided between the deflection yoke 44 and the convergence coils 45—47 in order to prevent intercoupling among the fields of these devices.

Figures 4, 5:
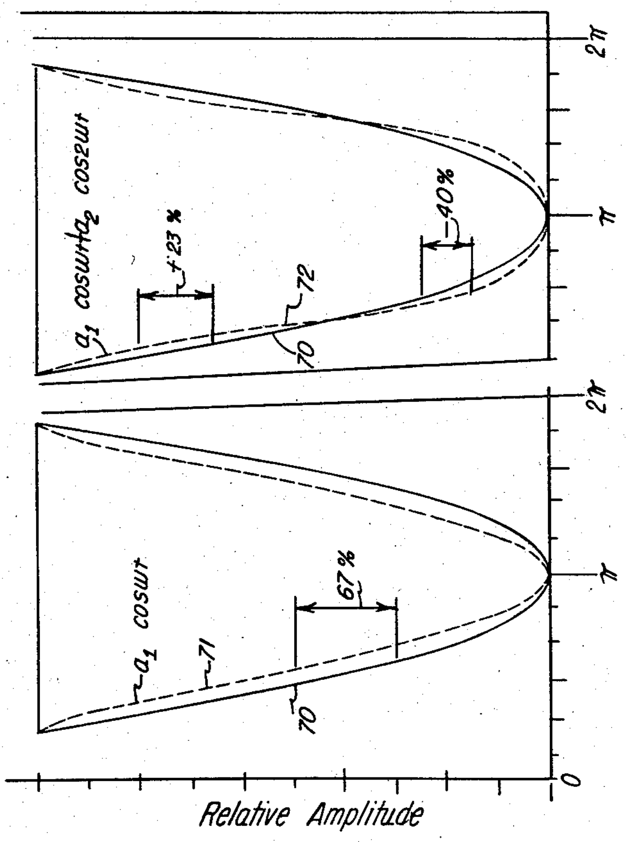

As explained previously, a cosine wave at the horizontal scanning frequency roughly approximates the desirable parabolic wave form required for horizontal dynamic convergence of the electron beams. The desired current wave form 70 shown in Fig. 4 is compared in that figure with a cosine wave 71 expressed by the formula $a_1 \cos wt$. As shown in this figure, when the cosine wave 71 and the wave form 70 are coincident at the start, middle and finish of the beam trace there is considerable departure or error along the majority of the curves. The error as shown at one point, reaches a maximum of 67%. If the wave is broadened to reduce the error on either side of pi, or the center of the screen, the error at the start and finish of the trace is considerably greater than 67%.

Fig. 5 shows a wave form 72 represented by the equation $a_1 \cos wt + a_2 \cos 2\, wt$ as compared with the parabolic wave form 70. As is evident, the wave 72 is comprised of a cosine wave and a portion of its second harmonic. It may be noted that this wave form may be made coincident with the desired wave form 70 at the start of the beam trace, at the quarter point, the half point, the three-quarter point, and the finish of the beam trace. Furthermore, the error is reduced to 23% in the first and last quarters of the beam trace and 40% in the second and third quarters of the beam trace. With circuitry constructed in accordance with the present invention, utilization is made of the approximation of the wave form 72 to the wave form 70 in order to provide dynamic convergence of the electron beams as described above.

Fig. 3 illustrates a schematic diagram of a portion of the television receiving system as shown in Fig. 1. In this figure, the line sweep system 42 is shown to include a horizontal output transformer 73 which, as is familiar to those in the art, has a winding (not shown) to apply a deflection signal to the deflection yoke such as yoke 44. A winding 73*a* is provided on this transformer in order to supply a portion of the horizontal deflection signal through capacitor 74 and across coil 75, the bottom of which is grounded. Coil 77 is coupled to ground and through capacitor 76 to a tap point of winding 73*a*. Accordingly a lesser portion of the deflection signal appears across coil 77 than across coil 75. Variable resistors 85 and 86 are coupled across coil 77 and resistor 84 is coupled across coil 75. Variable arms of resistors 84—86 are coupled respectively to one side of one of coils 45, 46 and 47.

Components 74, 75 and 76, 77 form high pass LC half sections for advancing the phase of the horizontal deflection signal applied to the dynamic conversion circuit 55.

These networks are necessary since the horizontal sweep signal lags by such an amount that the lowest portion of curve 74, marked pi in Fig. 5, would not occur at the center of the viewing screen 34 (Fig. 1). Therefore these LC half sections are utilized to advance the phase of the energizing signal by approximately 22½° so that the convergence signals produced by the remainder of the apparatus properly reach their lowest points at the center of the television screen despite the fact that the horizontal scanning signal, or more particularly the retrace or flyback pulse energizing the convergence system, lags enough so that a balanced dynamic convergence signal would not otherwise be produced.

The reason for coupling network 74, 76 across the entire winding **73*a* while coupling the network 76, 77 across a lesser portion of this winding should also be pointed out at this time. As illustrated in Fig. 2 the convergence coil 45 is symmetrically positioned with respect to a vertical plane passed through the axis of the tube. In current practice the blue beam associated with the blue producing phosphor dots of screen 34 passes adjacent coil 50 while the red and green beams pass adjacent the other convergence coils. With a construction of this type it can be shown mathematically, and proven in practice, that the misconvergence of the blue beam is considerably greater than that of either of the other two beams so that a convergence signal of greater size must be used for a correction of the misconvergence of this beam. Accordingly a greater energizing signal is supplied across resistor 84 than is supplied across resistors 85 or 86. Resistors 84—86 are made adjustable so that the amplitude of the energizing signal for each convergence coil may be varied somewhat but it is deemed preferable to conserve energizing power, and thus lessen the power required from the horizontal sweep system by furnishing a greater signal for blue beam convergence than for the others since this will generally be required in practice. Finer adjustments in signal strength are then of course made through variation of resistors 84—86.**

Since the remaining circuitry associated with the convergence coils is similar for all three, an explanation will be given only in conjunction with coil 45. Winding 50 of coil 45 is coupled to the vertical dynamic convergence circuit 57 which may be constructed in accordance with circuits now known in the art. Winding 49 is coupled from the arm of variable resistor 84 to a network of circuit elements which provides bi-resonance at both the horizontal scanning frequency and the second harmonic thereof. This network includes a resistor 90 series coupled with a capacitor 91 which is connected to the grounded end terminal of resistor 84. The lower side of winding 49 is also coupled to coil 92 and in series with a parallel combination of capacitor 93 and variable capacitor 94 to the grounded terminal of resistor 84. The functioning of the components connected to the variable resistor 84 in order to provide the bi-resonant characteristic thereof, will now be explained in connection with Fig. 6.

Figure 6:
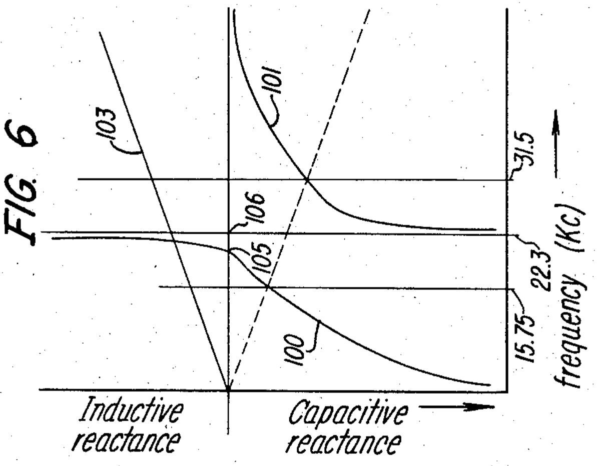
Figs. 4, 5 and 6 are curves useful in explaining the invention.

Curves 100 and 101 in Fig. 6 illustrate the reactance of elements 91—94 as utilized in the circuit of Fig. 3. It may be noted that these elements exhibit capacitative properties in the regions of 15 and 30 kilocycles. This is obtained by placing the two singularities of the network formed by elements 91—94, which is essentially a three element network, in the region of 22.5 kilocycles, that is at positions intermediate the 15 and 30 kilocycles regions. These singularities include a zero point 105, at which frequency the elements 92—94 are resonant, and a pole 106 at which frequency elements 91—94 are parallel resonant. A frequency of 15.75 kilocycles is commonly used in the horizontal scanning systems of present day receivers and it is assumed that the receiver being described herein utilizes signals of this frequency. Curve 103 represents the inductive reactance of winding 49 of convergence coil 45 and this winding together with the network comprised of elements 91—94 is series resonant for current at frequencies of 15.75 and 31.5 kilocycles. Accordingly, current flow through winding 49 may be formed as shown by wave form 72 in Fig. 5 through proper amplitude combination of the fundamental and second harmonic frequencies. It can be shown mathematically that if the fundamental frequency, that is the signal at 15.75 kilocycles, is four times the amplitude of that at the second harmonic, the resulting current wave will closely resemble that of a parabola at the fundamental frequency. The value of resistor 90 is accordingly chosen so as to limit the current amplitude of the second harmonic wave form to be approximately one quarter that of an amplitude of the fundamental current wave form.

As previously explained, the amplitude of the dynamic convergence signal applied to the convergence coil 45 may be adjusted through variation of the resistor 84 which changes the amount of energizing signal applied to the convergence coil. In order to provide optimum convergence of a given beam in a particular practical embodiment of television apparatus, it is often found necessary to "tilt" the parabolic wave form utilized for dynamic convergence. Such tilt renders the wave form asymmetrical for the best convergence in any given combination of receiver components encountered in practice. Variable capacitor 94 is in shunt with fixed capacitor 93 in order to provide such a tilt adjustment and variation of capacitor 94 may be used to alter slightly the resonant frequency of the system at the fundamental frequency without altering substantially the resonant frequency of the system at the second harmonic. Alternatively a variable resistor could be used in series with capacitor 94 for varying the fundamental resonant frequency of the system but this would tend to lower the Q of the resonant circuits and increase the energizing power required.

The following values of circuit components are given herein by way of an example of a practical construction of the system described.

| | |
|---|---|
| Winding **49** | 100 mh. |
| Winding **73*a*** | Provides 270 and 120 volt pulses. |
| Capacitor **74** | .05 mfd. |
| Coil **75** | 6 mh. |
| Resistor **84** | 2.5K ohms. |
| Resistor **90** | 4.7K ohms. |
| Capacitor **91** | 500 mmfd. |
| Inductor **92** | 150 mh. (minimum value to obtain frequency separation). |
| Capacitor **93** | 200 mmfd. |
| Capacitor **94** | 35–350 mmfd. |

The values of the circuit components utilized with convergence coils 46 and 47 may be the same as those listed above, in the example of the invention under consideration.

Figure 7:
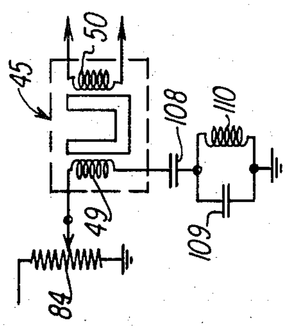
Fig. 7 is a diagram of a portion of the circuit of Fig. 3 in modified form.

Fig. 7 illustrates an alternate construction of the bi-resonant circuit shown in Fig. 3. In this version the bottom of winding 49 is coupled through capacitor 100 and the parallel combination of capacitor 109 and inductor 110 to the fixed end terminal of resistor 84. By proper selection of the values of capacitors 108 and 109 and the inductance of coil 110 in view of the inductance of winding 49, it is possible to obtain resonance at both 15.75 and 31.5 kilocycles in order that the current flow through winding 49 will resemble that shown by wave form 74 in Fig. 5. The circuit of Fig. 3 is deemed preferable, however, since all of the capacitors in the resonant network have a terminal grounded making construction more practical.

Therefore, it may be seen that this invention provides a simple and effective system from which may be obtained dynamic convergence signals for control of the electron beams in a tri-beam cathode ray tube according to its horizontal scanned position. The system incorporates adjustable elements in order to furnish necessary variations in the control produced in given practical embodiments. Furthermore, the system makes full use of resonance in the system which may use a high Q resonant network to require but a minimum of energizing power from the sweep system of the receiver without the incorporation of additional signal amplifiers. It should also be pointed out that the resulting convergence signals produced by the apparatus described, closely coincides with the desired parabolic wave form making the system entirely practical for use in a color television receiver.

I claim:

1. In an image reproducing system including a cathode ray tube having means for developing a plurality of cathode ray beam components and a sweep system for supplying to the tube a deflection field of predetermined frequency for scanning the beams across the viewing screen of the tube, the system for developing a convergence field for dynamically converging the cathode ray beam components during scanning, said system including in combination, circuit means providing a signal of the predetermined frequency, and a reactance network coupled to said circuit means, said reactance network including inductor means adapted to be positioned adjacent the cathode ray tube and to produce a field for converging one beam component with respect to another in response to current flow therethrough, said reactance network having at least a part thereof providing resonance substantially at both the predetermined frequency and the second harmonic thereof so that current of substantially parabolic form is developed by said inductor means for dynamically converging the beam components.

2. In an image reproducing system including a cathode ray tube having means for developing a plurality of cathode ray beams and a sweep system for supplying to the tube a deflection signal of predetermined frequency for scanning the beams across a screen of the tube, a system for developing a convergence field for dynamically converging the cathode ray beams during scanning, said system including in combination, circuit means associated with the sweep system to provide a signal of the predetermined frequency, a plurality of inductor means each adapted to be positioned adjacent the cathode ray tube and to produce respective fields for influencing the beams in response to current flow therethrough, and a plurality of impedance networks each coupled to one of said inductor means and together therewith coupled across at least a portion of said circuit means, said impedance networks including reactive portions providing resonance substantially at both the predetermined frequency and the second harmonic thereof and resistive portions providing fundamental and second harmonic components substantially in the amplitude ratio of four to one so that current waves of substantially parabolic form are developed in said plurality of inductor means for dynamically converging the beams.

3. In a color television receiver including a cathode ray tube having means for developing a plurality of cathode ray beams and a sweep system for supplying to the tube a deflection field of predetermined frequency for scanning the beams across a viewing screen of the tube, the system for developing a convergence field for dynamically converging the cathode ray beams during scanning, said system including in combination, circuit means providing a signal of the predetermined frequency advanced in phase with respect to that in the sweep system, inductor means adapted to be positioned adjacent the cathode ray tube and to produce a field for converging one beam with respect to another in response to current flow therethrough, and a reactance network coupling said inductor means to said circuit means, said reactance network including at least an inductor and a pair of capacitors and serving to resonate said inductor means substantially at both the predetermined frequency and the second harmonic thereof so that a current of substantially parabolic form is developed by said inductor means for dynamically converging the beams.

4. In an image reproducing system including a cathode ray tube having means for developing a plurality of cathode ray beams and a sweep system for supplying to the tube a deflection field of predetermined frequency for scanning the beams across a viewing screen of the tube, the system for developing a convergence field for dynamically converging the cathode ray beams during scanning, said system including in combination, circuit means providing a signal of the predetermined frequency, inductor means adapted to be positioned adjacent the cathode ray tube and to produce a field for converging one beam with respect to another in response to a current flow therethrough, and a reactance network coupling said inductor means to said circuit means, said reactance network including an inductor portion and a plurality of capacitor portions and serving to resonate said inductor means substantially at both the predetermined frequency and the second harmonic thereof, so that a current wave of substantially parabolic form is developed in said inductor means for dynamically converging the beams, one of said capacitor portions being variable for controlling the form of the current wave.

5. In a color television receiver including a cathode ray tube having means for developing a plurality of cathode ray beams and a sweep system including an output transformer in which appears a deflection signal of predetermined frequency for scanning the beams across a screen of the tube, a system for developing a convergence field for dynamically converging the cathode ray beams during scanning, said system including in combination, winding means on the output transformer to provide a signal of the predetermined frequency, a plurality of inductor means each adapted to be positioned adjacent the cathode ray tube and to produce respective fields for influencing the beams in response to current flow therethrough, and a plurality of reactance networks each coupled to one of said inductor means and together therewith coupled across at least a portion of said winding means, at least one of said inductor means and the associated reactance network being coupled across a greater portion of said winding means than another inductor means and network to derive a greater signal therefrom, said reactance networks including portions providing resonance substantially at both the predetermined frequency and the second harmonic thereof so that curent waves of substantially parabolic form are developed in said plurality of inductor means for dynamically converging the beams.

6. In a color television receiver including a cathode ray tube having first, second and third guns for developing respective cathode ray beams, with the first gun being positioned on a vertical axis through the tube, and a sweep system incorporating an output transformer in which appears a deflection signal of predetermined frequency for scanning the beams horizontally across a screen of the tube, a system for developing a convergence field for dynamically converging the cathode ray beams during scanning, said system including in combination, winding means on the output transformer to provide a signal of the predetermined frequency, a plurality of inductor means individually associated with the first, second and third guns and each adapted to produce respective fields for influencing the beams in response to current flow therethrough, and a plurality of reactance networks each coupled to one of said inductor means and together therewith coupled across at least a portion of said winding means, the inductor means and reactance network associated with the first gun being coupled across a greater portion of said winding means than the other inductor means and networks to derive a greater signal from said winding means, said reactance networks including portions providing resonance substantially at both the predetermined frequency and the second harmonic thereof so that current waves of substantially parabolic form are developed in said plurality of inductor means for dynamically converging the beams.

7. In a color television receiver including a cathode ray tube having means for developing three cathode ray beams and a sweep system including an output transformer in which appears a horizontal deflection signal of predetermined frequency for scanning the beams across an apertured shadow mask and screen of the tube, the system for developing a convergence field for dynamically converging the cathode ray beams in apertures of the shadow mask during horizontal scanning, said system including in combination, a winding on the output transformer providing a signal of the predetermined frequency, a converging coil adapted to be positioned adjacent the path of one beam and to produce a field for converging said one beam with respect to the others in response to current flow therethrough, and a capacitor-inductor network comprising a first capacitor shunted by a series combination of a second capacitor and an inductor, said network and convergence coil being series coupled to said winding to be energized by a signal therefrom, the respective values of said convergence coil, said inductor and said first and second capacitors at said predetermined frequency being such as to provide series resonance at said predetermined frequency and at the second harmonic thereof so that a current wave of substantially parabolic form is developed in said convergence coil for dynamically converging said one beam.

8. In a color television receiver including a cathode ray tube having means for developing three cathode ray beams and a sweep system including an output transformer in which appears a horizontal deflection signal of predetermined frequency for scanning the beams across an apertured shadow mask and screen of the tube, the system for developing a convergence field for dynamically converging the cathode ray beams in apertures of the shadow mask during horizontal scanning, said system including in combination, a winding on the output transformer providing a signal of the predetermined frequency, a convergence coil adapted to be positioned adjacent the path of one beam and to produce a field for converging said one beam with respect to the others in response to current flow therethrough, and a capacitor-inductor network comprising a first capacitor shunted by a series combination of a second capacitor and an inductor, said network having characteristics providing the reactance at said predetermined frequency which resonates said convergence coil at said predetermined frequency and providing the reactance at the second harmonic of said predetermined frequency which resonates said convergence coil at said second harmonic frequency, so that a current wave of substantially parabolic form is developed in said convergence coil for dynamically converging said one beam.

9. In a color television receiver including a cathode ray tube having means for developing three cathode ray beams and a sweep system including an output transformer for supplying to the tube a horizontal deflection signal of predetermined frequency for scanning the beams across an apertured shadow mask and screen of the tube, the system for developing a convergence field for dynamically converging the cathode ray beams in apertures of the shadow mask during horizontal scanning, said system including in combination, a winding on the output transformer providing a signal of the predetermined frequency, a convergence coil adapted to be positioned adjacent the path of one beam and to produce a field for converging said one beam in respect to the others in response to current flow therethrough, and a network comprising a first capacitor and resistor in series shunted by a series combination of a second capacitor and an inductor, said network and convergence coil being series coupled to said winding to be energized by a signal therefrom, the values of said convergence coil, said inductor and said first and second capacitors at said predetermined frequency being such as to provide series resonance at said predetermined frequency and the second harmonic thereof, said resistor being of such value that current in said convergence coil at said predetermined frequency is substantially four times as large as current at said second harmonic so that a current wave of substantially parabolic form is developed in said convergence coil for dynamically converging said one beam.

10. In a color television receiver including a cathode ray tube having means for developing three cathode ray beams and a sweep system including an output transformer in which appears a horizontal deflection signal of predetermined frequency for scanning the beams across an apertured shadow mask and screen of the tube, the system for developing a convergence field for dynamically converging the cathode ray beams in apertures of the shadow mask during horizontal scanning, said system including in combination, a winding on the output transformer providing a signal of the predetermined frequency, a convergence coil adapted to be positioned adjacent the path of one beam and to produce a field for converging said one beam with respect to the others in response to current flow therethrough, and a capacitor-inductor network comprising a first capacitor series coupled to a parallel combination of a second capacitor and an inductor, said network and convergence coil being series coupled to said winding to be energized by a signal therefrom, the values of said convergence coil, said inductor and said first and second capacitors being such as to provide series resonance at said predetermined frequency and at the second harmonic thereof so that a current wave of substantially parabolic form is developed in said convergence coil for dynamically converging said one beam.

11. In a color television receiver including a cathode ray tube having means for developing three cathode ray beams and a sweep system including an output transformer in which appears a horizontal deflection signal of predetermined frequency for scanning the beams across an apertured shadow mask and screen of the tube, the system for developing a convergence field for dynamically converging the cathode ray beams in apertures of the shadow mask during horizontal scanning, said system including in combination, a winding on the transformer providing a signal of the predetermined frequency, a convergence coil adapted to be positioned adjacent the path of one beam and to provide a field for converging said one beam in respect to the others in response to current flow therethrough, a capacitor-inductor network comprising first and second capacitors and an inductor, and a phase advancing network coupled to said winding to advance the phase of the signal therein, said capacitor-inductor network and convergence coil being series coupled across a portion of said phase advancing network to be energized by a signal therefrom, the respective values of said convergence coil, said inductor and said first and second capacitors being such so as to provide series resonance at said predetermined frequency and the second harmonic thereof so that a current wave advanced in phase with respect to the horizontal deflection signal and of substantially parabolic form is developed in said convergence coil for dynamically converging said one beam.

12. In a color television receiver including a cathode ray tube having means for developing three cathode ray beams and a sweep system including an output transformer in which appears a horizontal deflection signal of predetermined frequency for scanning the beams across an apertured shadow mask and screen of the tube, the system for developing a convergence field for dynamically converging the cathode ray beams in apertures of the shadow mask during horizontal scanning, said system including in combination, a winding on the transformer providing a signal of the predetermined frequency, a convergence coil adapted to be positioned adjacent the path of one beam and to provide a field for converging said one beam in respect to the others in response to current flow therethrough, and a network comprising first and second capacitors, an inductor and resistor means, said network and convergence coil being series coupled across at least a portion of said winding to be energized by a signal therefrom, the respective values of said convergence coil, said inductor and said first and second capacitors being such so as to provide series resonance at said predetermined frequency and the second harmonic thereof and said resistor being of such value so as to reduce the amplitude of signals at the second harmonic as compared to signals at said predetermined frequency so that a current wave of substantially parabolic form is developed in said convergence coil for dynamically converging said one beam.

References Cited in the file of this patent

UNITED STATES PATENTS

| | | |
|---|---|---|
| 2,672,574 | Evans | Mar. 16, 1954 |
| 2,677,779 | Goodrich | May 4, 1954 |
| 2,707,248 | Goodrich | Apr. 26, 1955 |
| 2,737,609 | Kelly et al. | Mar. 6, 1956 |
| 2,742,589 | Goodrich | Apr. 17, 1956 |
| 2,751,519 | Friend | June 19, 1956 |
| 2,801,363 | Sonnenfeldt | July 30, 1957 |